United States Patent
Topham

[11] Patent Number: 4,664,853
[45] Date of Patent: May 12, 1987

[54] ENERGY DISSIPATOR
[75] Inventor: Harland G. Topham, Rugby, England
[73] Assignee: The English Electric Company Limited, England
[21] Appl. No.: 820,237
[22] Filed: Jan. 21, 1986
[30] Foreign Application Priority Data
 Feb. 8, 1985 [GB] United Kingdom ............... 8503242
[51] Int. Cl.⁴ .............................................. B01F 3/04
[52] U.S. Cl. ...................................... 261/62; 138/42; 138/45; 137/625.3; 137/625.38
[58] Field of Search ................... 138/43, 45, 42; 137/625.3, 625.38; 261/62

[56] References Cited
U.S. PATENT DOCUMENTS

| | | | |
|---|---|---|---|
| 289,954 | 12/1883 | Badger | 137/625.35 |
| 1,143,999 | 6/1915 | Rosencrans | 137/625.38 |
| 1,178,253 | 4/1916 | Marshall | 137/625.38 |
| 1,329,559 | 2/1920 | Telsa | 138/37 |
| 2,664,109 | 12/1953 | Iager | 138/42 |
| 3,347,303 | 10/1967 | Herman | 138/42 |
| 3,954,124 | 5/1976 | Self | 137/625.3 |
| 3,971,411 | 7/1976 | Baumann | 138/43 |
| 4,105,048 | 8/1987 | Self | 138/43 |
| 4,418,717 | 12/1983 | Pauliukonis | 138/42 |
| 4,473,210 | 9/1984 | Brighton | 138/43 |

FOREIGN PATENT DOCUMENTS 1207731 12/1965 Fed. Rep. of Germany ........ 138/42

Primary Examiner—Tim Miles
Attorney, Agent, or Firm—Kirschstein, Kirschstein, Ottinger & Israel

[57] ABSTRACT

An energy dissipator for downwardly discharged water utilizes a hollow cone valve located in a chamber open to the atmosphere and arranged to direct water emerging therefrom at an angle inclined downwards from the horizontal towards a region of a surrounding wall, and a pair of troughs around the inner surface of the wall above and below the region with the open mouths of the troughs facing each other. The troughs serve to reduce considerably the incoming energy of the water in a relatively small volume, the effect being enhanced by splitting the water emerging from the cone valve into a series of discrete jets, between which air can flow.

11 Claims, 4 Drawing Figures

Fig. 3.
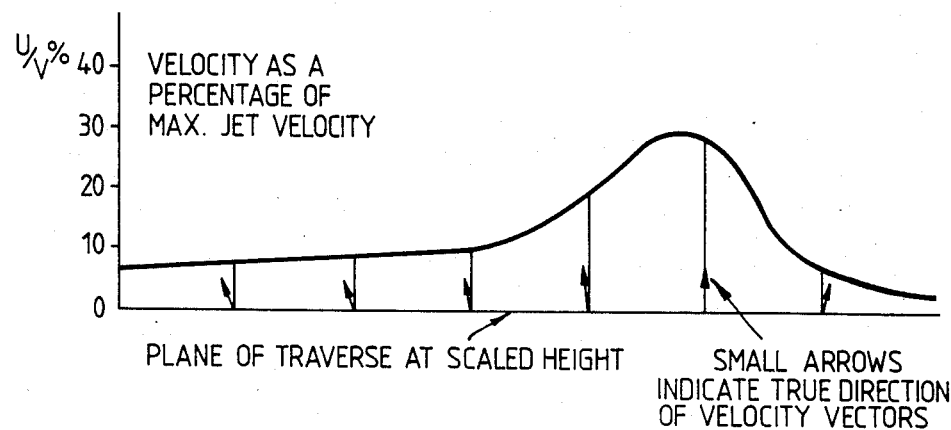
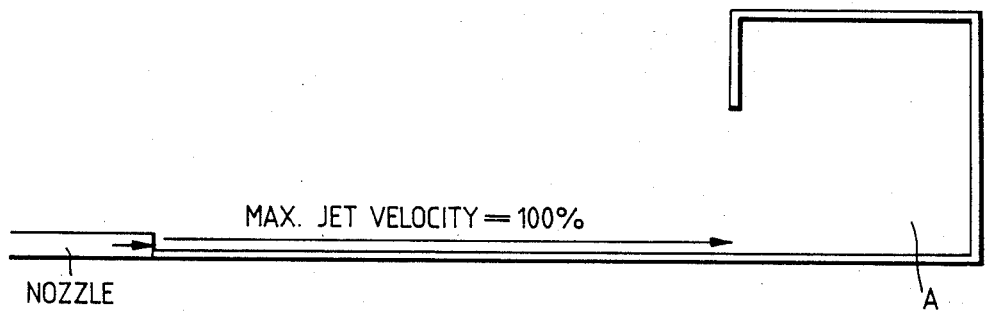
ENERGY DISSIPATOR

ENERGY DISSIPATOR

BACKGROUND OF THE INVENTION

1. Field of the Invention

This invention is for energy dissipators such as may be linked with water turbine relief and bypass valves or irrigation or water works discharge regulating valves.

2. Description of Related Art

When transferring water from high level canals to low level canals through a penstock, it is necessary to control the water at the penstock outlet by means of a discharge regulating valve.

The velocity of the water emerging from the valve is $Cv.\sqrt{2gH}$ where

Cv is the coefficient of velocity g is the acceleration due to gravity; and

H is the height from head water level to the valve outlet minus the loss of head arising from friction in the penstock.

If the low level canal is replaced by a lake of some width, length and depth, then the kinetic energy of the effluent can be destroyed either by angling the jet to 45° from the horizontal into the air or by discharging under the water in a horizontal direction. A common method is to use a hollow valve with a conical base disposed with its apex directed upwards towards the incoming flow of water so that it spreads the water over a large area, and rapidly reduces the thickness of the annular jet, thereby reducing the concentration of kinetic energy and the propensity for destruction.

When however a canal of small lateral dimensions is used to conduct the effluent away it is not possible to use any of the means described above, since the water would jet over the canal or if discharged into the canal would rapidly erode the bed and walls, especially at very high heads.

The problem is most acute when the discharge regulating valve is combined with a turbine relief valve which discharges into the turbine draft tube. As a relief valve it may only operate a few times a year for 60 seconds at a time and hence it is unlikely to do any permanent damage to the draft tube and the tail race structures. However, when the same valve is used continuously as a turbine by-pass valve considerable damage can be done in a matter of days.

The remedy is to fit an energy dissipator after the turbine relief and by-pass valve and so reduce the velocity to an acceptable level where it will not do any damage to the downstream structures.

Energy dissipation can be effected by staging the destruction of energy by causing the water to contract and expand suddenly. This method is feasible provided that the number of stages is such that cavitation does not take place at the points of contraction. It therefore calls for a relatively large dissipation chamber. It also creates a back pressure which in turn requires a larger discharge regulating valve. However a serious drawback is that the energy dissipation is proportional to discharge squared, hence at low discharges it is less effective than at high discharges. Furthermore, the pressure drop across the discharge regulating valve is no longer constant.

A way around this problem is to employ a multi-stage valve, but this again is expensive and has to be carefully designed to ensure that cavitation cannot occur. The ultimate stage in a high head installation can be several times larger than the first stage valve.

When either of the foregoing expedients are employed, the mismatch with turbine characteristics may render them unsuitable for relief valve duty as the mismatch may be conducive to water hammer.

The ideal discharge regulating valve is one which has a linear discharge-stroke characteristic, discharges freely into a chamber which is well ventilated to atmosphere and where the process of energy dissipation is not influenced by changes in flowrate.

Discharge regulating valves/turbine relief valves are conventionally either needle/mushroom valves or variants of the hollow conical-based valve. The former type produces a concentrated cylindrical jet which has to be dispersed by making it strike symmetrically onto the apex of a cone. The hollow conical-based type of valve automatically spreads the jet into a conical fan shape and by virtue of conservation of mass and density the jet becomes a relatively thin annulus which reduces in thickness according to the inverse square law.

SUMMARY OF THE INVENTION

An object of the invention is to provide a particularly advantageous form of energy dissipator which makes use of a valve of this latter type.

According to the invention an energy dissipator incorporates a hollow valve located within a chamber open to the atmosphere, and arranged to direct water emerging therefrom in a cone-shaped spray at an angle inclined downwards from the horizontal towards a region of a surrounding wall, the dissipator including also a pair of troughs extending around the inner surface of said wall above and below said region with the open mouths of the troughs directed towards each other.

The troughs serve to reduce considerably the incoming energy of the water in a relatively small volume, and by the use of appropriately dimensioned and positioned troughs this can be achieved without producing any significant cavitation or flow fluctuations.

The outside wall of each trough may be provided by part of the wall surrounding the hollow cone valve and, which wall is conveniently constituted by a wall of the chamber in which the valve is located. The wall is preferably cylindrical, the troughs in such a case being of annular shape.

The rim of the radially inner wall of the lower trough may be provided with a turned-over lip which extends outwards over the trough towards the surrounding wall, and the inner wall of the upper trough may be inclined inwards away from the surrounding wall.

Preferably the valve has around its outlet a baffle provided with a plurality of circumferentially spaced ports causing the water to emerge therefrom in use as a series of discrete jets between which the air can flow, this being found to enhance the air flow and the degree of energy dissipation.

The chamber exit duct is preferably provided on its walls with a plurality of additional troughs having their mouths facing in an upstream direction. These may be spaced longitudinally along the duct, the shape, positions and dimensions of the troughs giving the most satisfactory results being readily ascertainable by trial.

Preferably the additional troughs are provided with turned-over lips as in the case of the lower trough in the valve chamber.

BRIEF DESCRIPTION OF THE DRAWINGS

One energy dissipator in accordance with the invention will now be described by way of example with reference to FIGS. 1 to 4 of the accompanying drawings, in which FIGS. 3 and 4 illustrate the manner in which the dissipator functions.

DETAILED DESCRIPTION OF THE PREFERRED EMBODIMENTS

Figure 1:
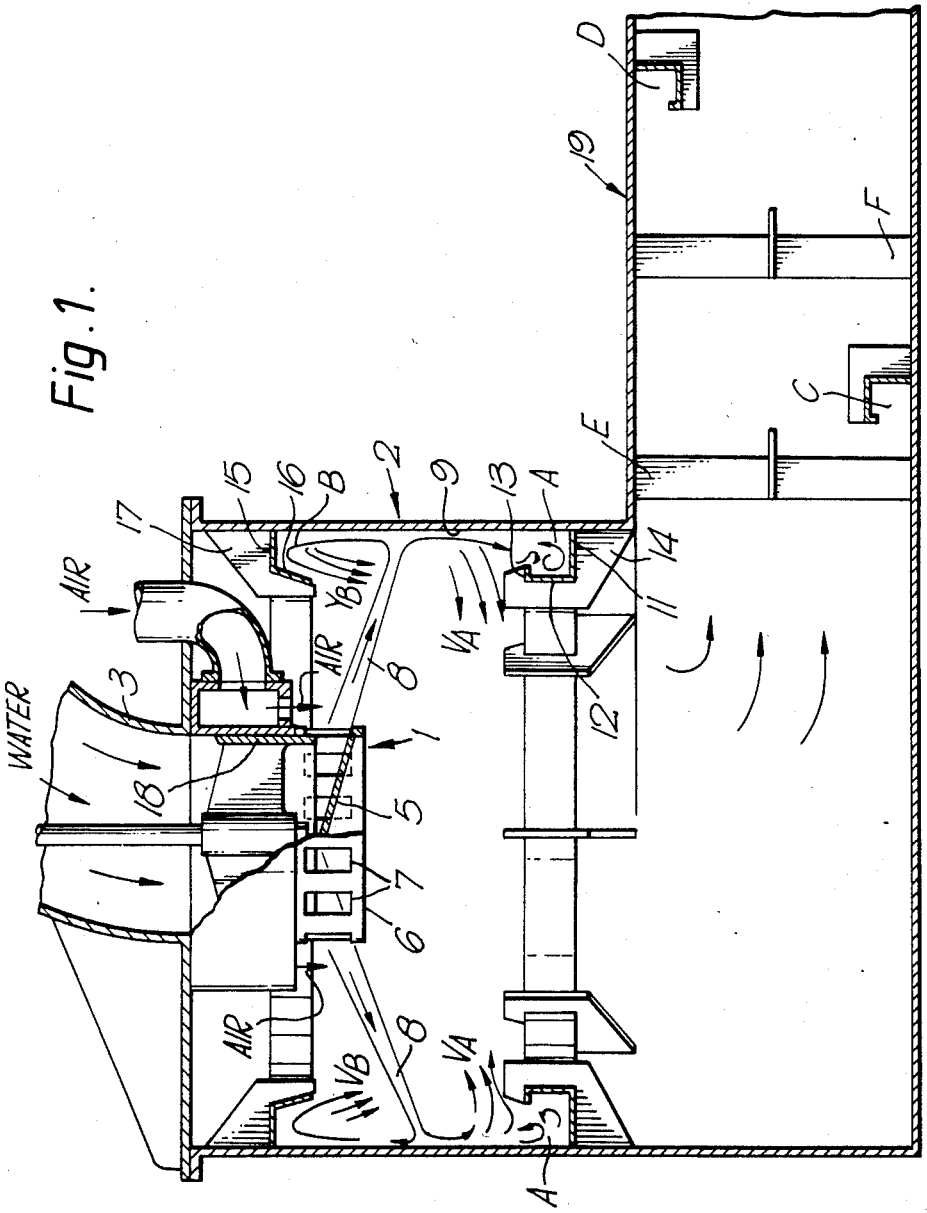
FIGS. 1 and 2 represent in diagrammatic form a sectional elevation and a sectional plan view of the energy dissipator.
Figure 2:
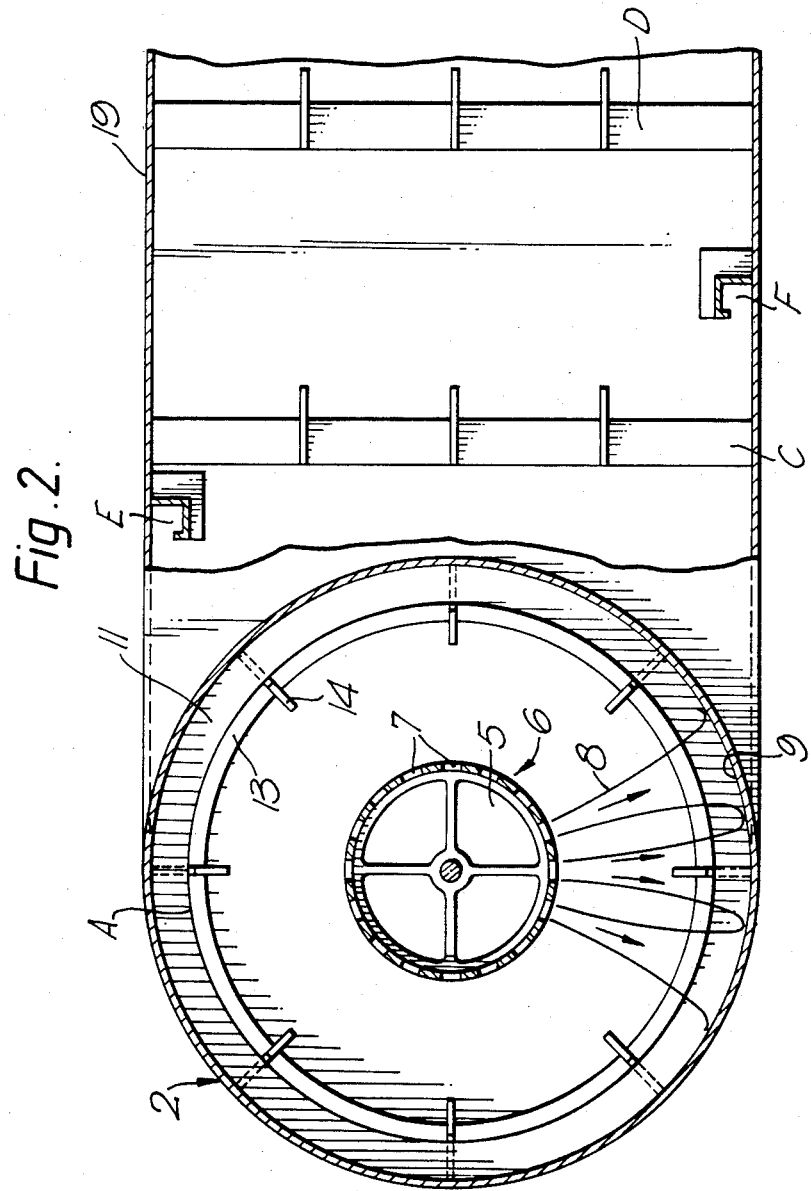

Referring first to FIGS. 1 and 2 of the drawings a hollow conical-based valve 1 is situated on the vertical centreline of a vertical cylindrical vessel 2. An inlet duct 3 feeds water into the valve through a top wall 4 of the vessel.

The conical valve base 5 is surrounded by a cylindrical baffle 6 having a series of rectangularly-shaped ports 7 uniformly disposed around it so that the emerging water forms a series of jets, as at 8, which discharge downwards at an angle between 20° and 45° from the horizontal. The jets 8 strike the cylindrical wall 9 of the vessel 2 and split vertically with a thick lamina $V_A$ discharging downwards and a thinner lamina $V_B$ discharging upwards. Although these lamina are of small radial thickness they are of substantial velocity $= Cv.\sqrt{2gH}$ and it is this velocity which must be reduced.

This is achieved, in accordance with the invention, by the provision below and above the region of the wall 9 of the vessel against which the jets 8 impinge, of two annular troughs A, B respectively, each with its mouth facing towards the other.

The trough A is formed of an annular plate 11, a cylindrical plate 12 and a smaller annular plate 13 welded together and to the wall 9 of the vessel 2, part of which thus provides the outer wall of the trough. Radial stiffeners are provided at 14.

The trough B consists of an annular plate 15 and a frusto conical plate 16 similarly welded to each other and to the wall 9, which again provides the outer wall of the trough. Radial stiffeners are similarly provided as at 17.

In use the troughs A, B produce a change in the direction of the fluid streams $V_A$, $V_B$ resulting in a reduction in the incoming energy. Moreover the streams then converge, the stream $V_A$ colliding partly with the main jets 8 from the valve 1, partly with itself and partly with the stream $V_B$, so that further mixing and energy destruction takes place.

The shapes of the troughs described have been found to have considerable merit in the reduction of the kinetic energy involved in the wall jets as explained with reference to FIGS. 3 and 4, the principal difference between them being in the direction of the angle of efflux of the low velocity fluid leaving the respective troughs.

This is illustrated in the non-dimensional velocity plots of the emerging low velocity fluid together with the salient angle of the efflux.

It will be seen that the angle of efflux is the decisive result which determines which shape may be used at the particular location.

Figure 4:
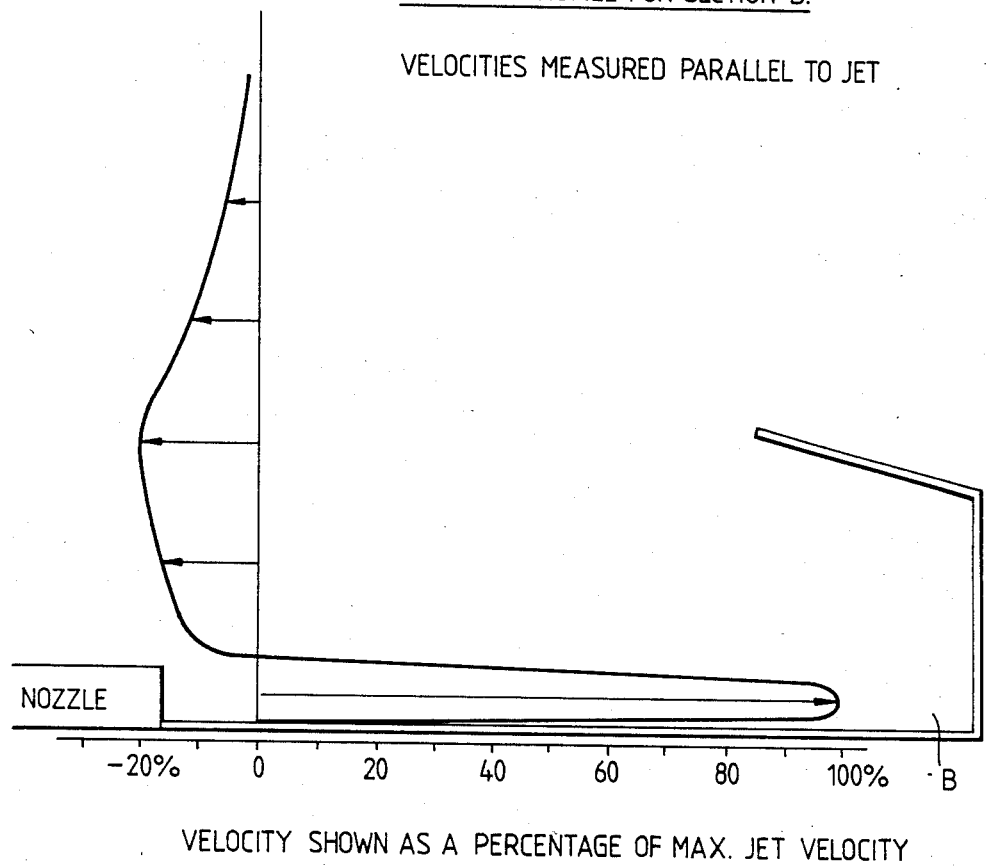

Thus examination of FIGS. 3 and 4 show that these devices reduce the non-dimensional velocity from 1 to about 0.3 and so ensures about 90% destruction of the incoming energy. Furthermore from the velocity profiles it will be seen that the effluxes are highly turbulent, which assists in the reduction of energy, and without producing any significant degree of cavitation.

The valve 1 is provided, in known manner, with a vertically movable closure member 18 in the form of a cylinder which co-operates with the upper surface of the valve base 5.

The exit duct 19 from the vessel 2 is of rectangular cross section and the inner surfaces of the walls of the duct are provided with straight troughs C, D, E and F each of similar cross section to the trough A and each disposed with its mouth facing in the upstream direction.

These additional troughs are respectively intended to prevent high velocity wall jets progressing along the exit duct. The trough C is located in the floor of the duct and D in the roof. They are staggered to ensure maximum effectiveness in intercepting high velocity fluid. Troughs E and F disposed at the sides of the duct and are also staggered to destroy high velocity wall jets on these walls. The construction is similar to that of the trough A except that straight plates are employed, the plates being similarly welded to each other and to the walls and being supported by stiffeners 24.

The further troughs serve to provide additional energy dissipation, and the maximum velocity emerging from the duct can, in many cases, be kept below 10% of the jet velocity.

An essential to the smooth operation of the discharge regulating valve and the accompanying energy dissipator is a copious inflow of atmospheric air. In the arrangement shown in FIG. 1 air passes into the vessel 2 through a pipe 20 the flow rate being enhanced by the use of the circumferentially disposed ports 7 around the hollow conical-based valve which produces the discrete jets between which air can be induced to flow.

Additionally the velocity vector $V_B$ has a downwards component which is aimed at deflecting the horizontal vector $V_A$ into the downwards direction thus limiting the amount of back pressure in the vertical direction which will prevent air suction from the atmosphere. The invention provides a relatively compact energy dissipator, which is especially beneficial when used in hydroelectric power stations, as space costs money and therefore energy dissipation of the equivalent rated output of the turbine needs to be carried out in as small a space as possible.

I claim:

1. An energy dissipator incorporating a hollow valve located within a chamber open to the atmosphere, and arranged to direct water emerging therefrom in a cone-shaped spray at an angle inclined downwards from the horizontal towards a region of a surrounding wall, the dissipator including also a pair of troughs extending around the inner surface of said wall above and below said region with the open mouths of the troughs directed towards each other.

2. An energy dissipator according to claim 1 wherein the outside wall of each trough is provided by part of the wall surrounding the hollow valve.

3. An energy dissipator according to claim 2 wherein the walls of the chamber are cylindrical and the said troughs are of annular shape.

4. An energy dissipator according to claim 3 wherein the rim of the radially inner wall of the lower trough is provided with a turned over lip which extends outwards over the trough a part of the way towards the surrounding wall.

5. An energy dissipator according to claim 4 wherein the inner wall of the upper trough is inclined inwards away from the surrounding wall.

6. An energy dissipator according to claim 1 wherein the said valve has around its outlet a baffle.

7. An energy dissipator according to claim 6 wherein the baffle is provided with a plurality of circumferentially spaced ports causing the water to emerge therefrom in use as a series of discrete jets between which the air can flow.

8. An energy dissipator according to claim 1 wherein the chamber exit duct is provided on its walls with a plurality of additional troughs having their open mouths facing in an upstream direction.

9. An energy dissipator according to claim 8 wherein the said additional troughs are spaced longitudinally along the exit duct.

10. An energy dissipator according to claim 8 wherein the inner walls of said additional troughs are provided with turned over lips extending outwards a part of the way towards the outer wall.

11. An energy dissipator according to claim 8 wherein any one or more of any of the troughs are provided with stiffeners.

* * * * *